F. J. SPRAGUE.
ELECTRIC DETECTOR CIRCUIT.
APPLICATION FILED FEB. 26, 1916.

1,248,942.

Patented Dec. 4, 1917.
5 SHEETS—SHEET 1.

F. J. SPRAGUE.
ELECTRIC DETECTOR CIRCUIT.
APPLICATION FILED FEB. 26, 1916.

1,248,942.

Patented Dec. 4, 1917.
5 SHEETS—SHEET 2.

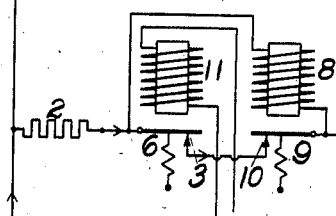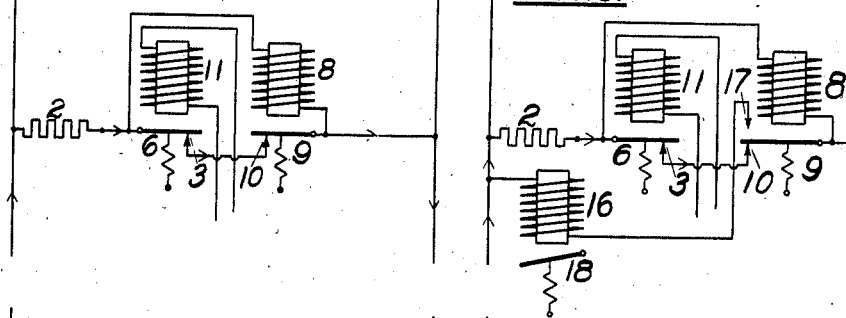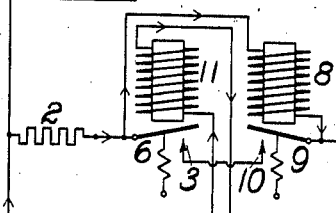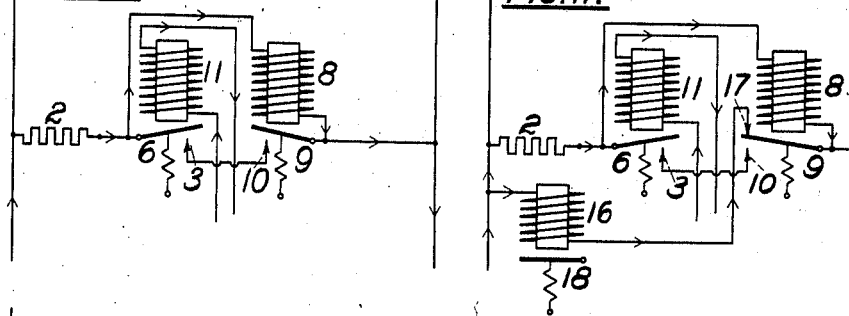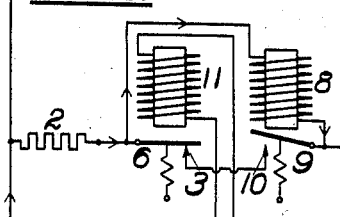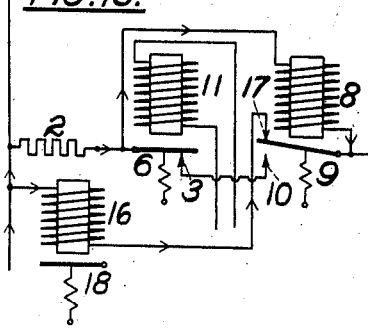

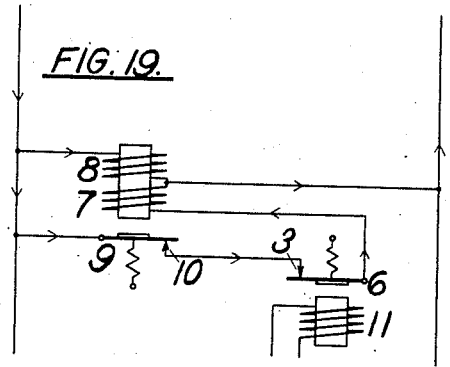
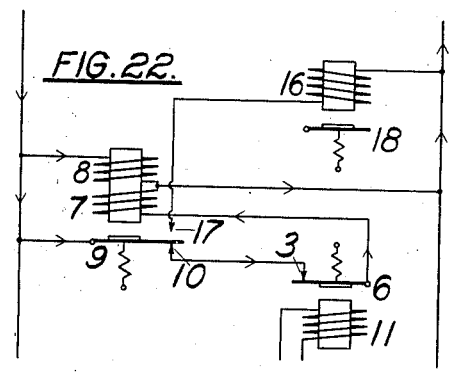
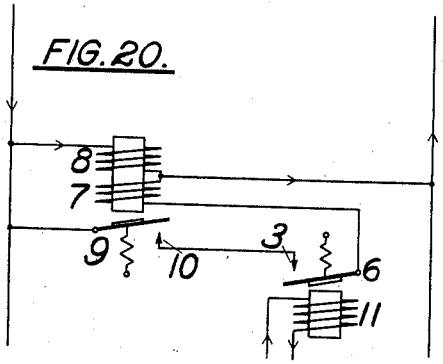
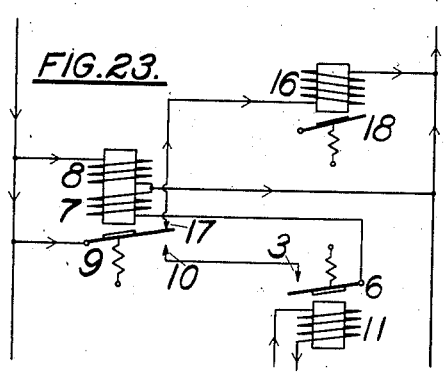
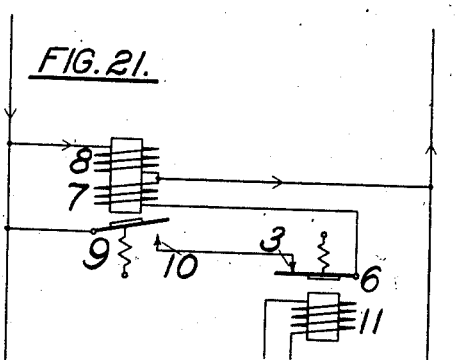
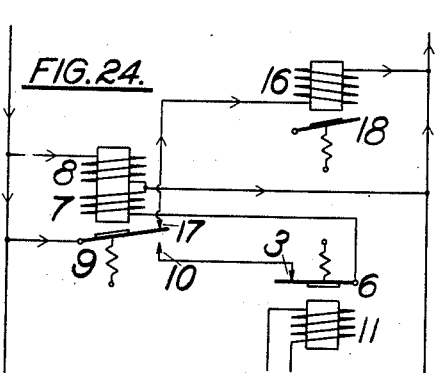

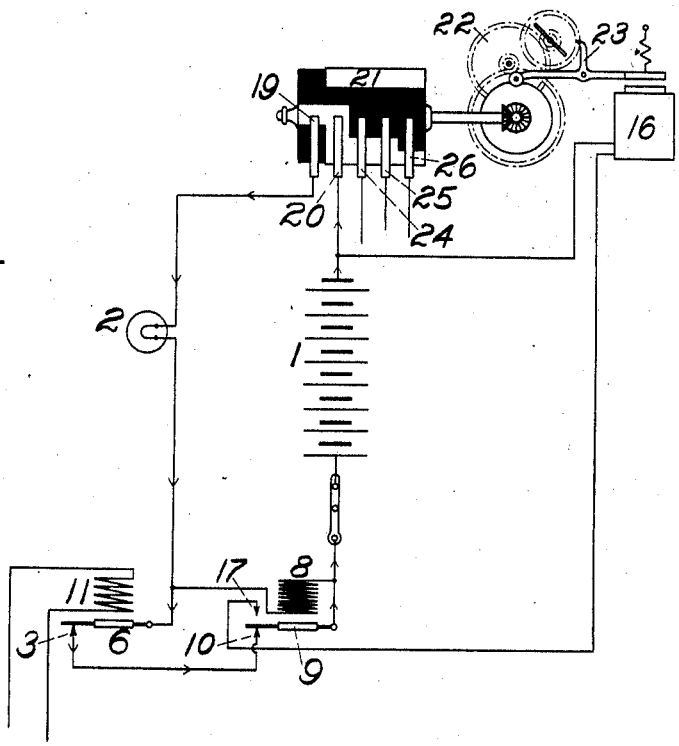

UNITED STATES PATENT OFFICE.

FRANK J. SPRAGUE, OF SHARON, CONNECTICUT, ASSIGNOR TO SPRAGUE SAFETY CONTROL AND SIGNAL CORPORATION, A CORPORATION OF VIRGINIA.

ELECTRIC DETECTOR-CIRCUIT.

1,248,942.      Specification of Letters Patent.      Patented Dec. 4, 1917.

Original application filed December 31, 1914, Serial No. 879,939. Divided and this application filed February 26, 1916. Serial No. 80,714.

*To all whom it may concern:*

Be it known that I, FRANK J. SPRAGUE, a citizen of the United States, residing at Sharon, in the county of Litchfield and State of Connecticut, have invented certain new and useful Improvements in Electric Detector-Circuits, of which the following is a specification.

This application is filed in response to a requirement of the Patent Office as a division of my prior application filed December 31, 1914, Serial No. 879,939, for method of and apparatus for control of train movements; and the subject-matter hereof forms a part of the apparatus disclosed in the aforesaid prior application for effecting the results indicated by the title thereof. In this application such subject-matter is disclosed and claimed without reference to the question of train control, in that the invention embodied herein is capable of other and varied uses, its object being to provide a detector circuit in which a brief and feeble electromotive force can be effectively utilized to bring about a subsequent operation or cycle of operations requiring greater dynamic effort. Obviously, the operation or cycle of operations so produced may be in turn utilized to accomplish many purposes, but inasmuch as the particular results flowing from such operations form no part of this invention it is unnecessary to here specify them.

Briefly stated, the invention here sought to be protected consists of a novel circuit containing a source of constant low potential electric supply with means for restricting current flow in series with a normally shunted coil of an electro-magnet, in combination with external means for momentarily opening said shunt in order to energize the magnet, and means controlled by said magnet for prolonging said shunt opening and the consequent activity of the magnet itself.

The means for opening the shunt may be of the most varied character. It may be operated mechanically, magnetically or electrically. The shunt may be held spring-closed or magnetically or electrically closed against spring action. If spring-closed it may be opened electrically or by magnetic action, or if held closed by such action against spring retraction the shunt may be opened by removal of the closing force.

In the preferred form illustrated in the present application the shunt is normally spring-closed, but momentarily opened by induced electro-magnetic action; and the shunt opening is prolonged by the then energized magnet opening the shunt at separate contacts in series with those first opened before the latter are closed.

Figures 1, 2, and 3 are diagrams illustrating the principle of this invention.

Figs. 4, 5, and 6 are diagrams showing the application of the principle illustrated in Figs. 1, 2, and 3 to a circuit containing my invention.

Figs. 7 to 24 show other circuit arrangements falling within the invention.

Fig. 25 is a diagram illustrating means for automatically effecting at the expiration of a desired interval the restoration of the circuit parts to normal position.

As the operation of my improved circuit depends initially upon the momentary breaking of contacts in a shunted circuit, instead of the making of contacts in a series circuit, this operation must be thoroughly considered before its place in my system can be fully comprehended.

Figure 1:
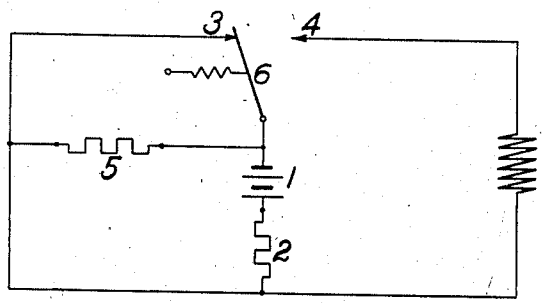

Fig. 1 shows a source of constant low potential (current supply) represented by a battery 1, connected on one side to a non-inductive resistance 2, to prevent (under the condition shown) excess current and exhaustion of battery, from which non-inductive resistance, connections lead to contacts 3 and 4. The other side of the battery connects with a resistance 5 and with a spring retracted pivoted arm 6, which is normally spring retracted against the contact 3, but which is capable of being moved against the tension of its spring toward or to the contact 4. The circuits through contact 3 and resistance 5 are evidently in parallel relation.

Any force applied to the arm 6 sufficient to overcome the tension of its spring will make physical break at the contact 3, and if the difference of potential at the shunted contacts at the moment of physical breaking is negligible there will likewise be an electric break, no matter if the physical movement be not over a thousandth of an inch and the time interval of break but of the minutest duration. For all practical purposes, the potential at the break can be made sufficiently low to be negligible if the current be taken from a source of low constant potential through a non-inductive resistance and the break be non-inductive and shunted.

Suppose, however, that it be desired to close the circuit at the contact 4, then the force applied must exceed that represented by the increasing tension of its spring as the arm is moved over the intervening gap; and of course any force equal or superior to this will, if applied for a sufficient interval of time, effect closure at this contact.

But suppose that the applied force be only a fleeting effort, in which case its energy is measured by time and force, while the energy required to move the arm is a definite amount represented by the average tension of the spring multiplied by the distance through which it is stretched, increased by such as is represented by the mass movement of the arm. Then, even with a considerable force, if it be applied for a very short time only, the arm might not be carried over to engagement, or might break contact at 4 too quickly to insure the required result sought by such contact.

Therefore the conditions obtain, that any force sufficient to move the arm at all will break contact at the contact 3 even if applied for only a very brief period of time, while considerably larger initial forces applied for like intervals of time may not insure closure at the contact 4.

These simple facts underlie the principle of detector operation by momentary contact break, made either mechanically or by fleeting electrical or magnetic impulses, whether direct or alternating, to initiate a subsequent cycle of operations requiring greater dynamic efforts.

Figure 2:
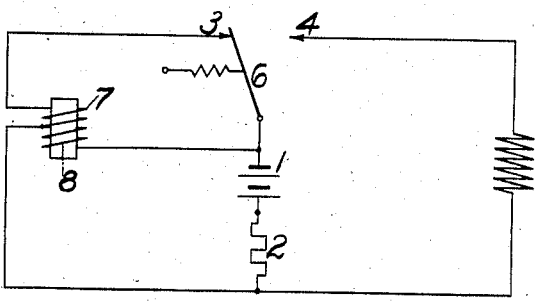

To make this principle available in the form of apparatus described in this application, that is, at the instant of breaking contact at 3, to energize a circuit which shall initiate or actuate a dynamic effort of some kind, all that is necessary is to utilize, in the form of a coil, the resistance 5 in shunt to the contact 3, which prior to the breaking of the contact has a negligible current flowing therein, but which on breaking contact at the contact 3 instantly becomes active. Or such shunt can comprise two opposite coils, one in each leg of the shunt, as is illustrated in Fig. 2 at 7 and 8, the other elements of the figure being the same as in the preceding figure. In this latter case, it is apparent that while the two coils are energized the magnetic results will be neutralized, but when the circuit of one, 7, is broken at contact 3, the remaining coil 8, will become effective. With this adaptation the resistance 2 may be omitted, for the coil 8 interposes the necessary resistance to current flow.

Figure 3:
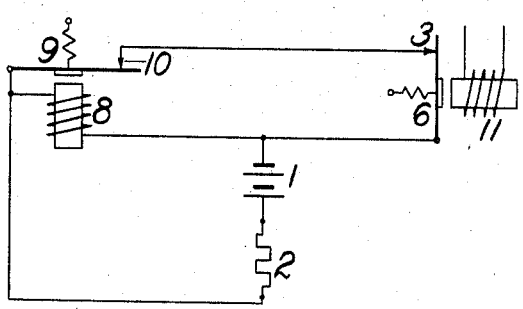

Fig. 3 is an operative circuit diagram showing an application on the principles outlined in the preceding diagrams. In this, the contact 4 and its lead are omitted, and the circuit from the battery 1, through its resistance 2, is completed through a two branch circuit, one branch including the coil 8 and the other the two spring-retracted armatures 9 and 6 impinging upon the series connected contacts 10 and 3.

When in normal position the current from the battery 1 flows through the non-inductive resistance 2, and then mainly through the shunt circuit contacts 10 and 3 in series, a very small portion going through the coil 8, which is therefore practically inert, and without strength enough to retract its armature 9, against the pull of its spring, sufficiently to open circuit at the contact 10.

Suppose now that the contact at 3 be broken by movement of the armature 6, either mechanically or, for example, by the pull of a relay 11 energized momentarily from any source. The shunt path being thus broken, the coil 8 will instantly become active and retract the armature 9, opening the shunt also at the contact 10; and since the contacts 10 and 3 are in series with each other it is evident that the contact 3 can now be closed, but that the contact 10 will be kept open by the energized coil 8. It will also be seen that since the prolonging of the open shunt condition is effected simply by the breaking of a circuit at a second point prior to its closure at an initial breaking point, the time element required to insure operation of the apparatus may be made extremely short, because such operation is initiated by the breaking of contact 3 at the beginning of the motion of armature 6, the maintenance of the open circuit is insured also by the breaking of contact 10 at the beginning of the motion of armature 9, and coil 8 is constantly potentialized, so that its current increment takes place practically instantly on the breaking of contact 3. Once the coil 8 has become energized it remains energized until its circuit is broken by other means than those indicated in the figure. It thus performs the function of a maintaining coil during the energization of which current flows through the resistance 2.

Although, manifestly, the contact 3 may be broken in a variety of ways, and the variants of sequential results are many, fundamentally the principle illustrated in Figs. 1 to 3 is unchanged; for whatever the minor variations, there is a source of constant potential low pressure supply in series with a maintaining coil and a magnet deënergizing shunt therefor, the circuit so formed having sufficient resistance to keep down the normal current in said circuit, and external means for opening the shunt around the magnet, such opening being prolonged by the maintaining coil.

The relay 11 can be considered for all intents and purposes the initial active element of my detector system, or for brevity, the actuator.

I have described a maintaining coil whose function is to continue the action of a momentary break in a circuit, but its action is distinctly different from that of the maintaining coils used in, for example, my multiple-unit system for railways, described in Patent No. 660,065.

In the latter type a coil normally open-circuited is in series with two contacts in parallel relation to each other, one of which is closed by some external agency and the other of which is closed by action of the maintaining coil itself when energized, the latter remaining closed while the first mentioned contact in parallel with it is broken.

In the preferred form of maintaining coil and circuit which form elements of the detector I have described in this specification, the core of the maintaining coil is normally dead, and a normally live circuit is maintained in a shunt around the maintaining coil through two contacts in series, one of which may be broken by an external agency and the other by the maintaining coil when it becomes energized because of that break.

The one form depends upon the making of contacts which are in parallel with each other and in series with the maintaining coil, while the other depends upon the breaking of contacts which are in series with each other but are in a circuit parallel with the maintaining coil.

Figs. 4 to 24 inclusive, illustrate the principle and circuit action of the detector under varying conditions. The battery 1 is not shown, but the leads from its terminals are illustrated by vertical lines at the left and right of each figure respectively, a constant low potential source in circuit with the leads being assumed.

Figure 4:
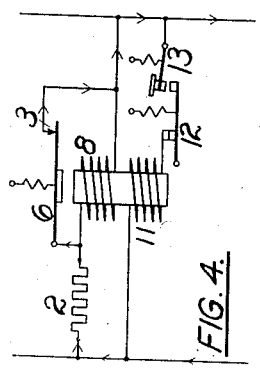
Figure 5:
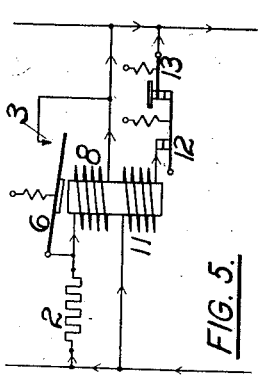
Figure 6:
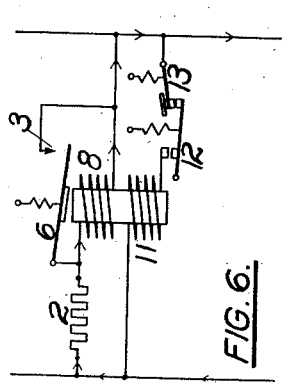

Figs. 4 to 6 inclusive show the maintaining coil 8 connected across the battery leads through the resistance 2. The maintaining coil has around it a low resistance shunt comprising the armature 6 and contact 3. The detector relay 11 is also connected across the battery leads, through pivotally mounted spring-retracted switches 12 and 13 in series. The detector relay is wound on the same core as the maintaining coil.

Fig. 4 shows the switch 12 closed and the switch 13 open, with current flowing through the resistance 2 and the shunt formed by the armature 6 and contact 3 around the maintaining coil 8, while the detector relay 11 is dead.

In Fig. 5 the switch 13 is closed, the switch 12 remaining closed also. Current flows through the detector relay and the magnet core common to the two coils is energized, pulling down the armature 6 and breaking the shunt circuit at the contact 3. The current now passes through the maintaining coil, and if direct current is used and the coils are wound in proper relation the current in the maintaining coil will coöperate with the current in the detector relay to hold down the armature 6 and keep the shunt circuit open.

In Fig. 6 the switch 13 has been further depressed, breaking contact at the switch 12 and open-circuiting the detector relay; but the circuit in the maintaining coil remains closed and the armature 6 is still retracted, so that the shunt is kept open at the contact 3, and the core, under the influence of the maintaining coil, remains energized. By a quick complete downward movement of the switch 13, the time of current flow in the actuator, i. e., the detector relay, can be made as short as desired.

Figure 7:
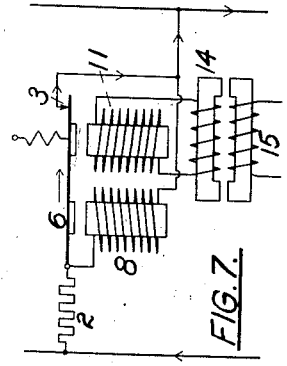
Figure 8:
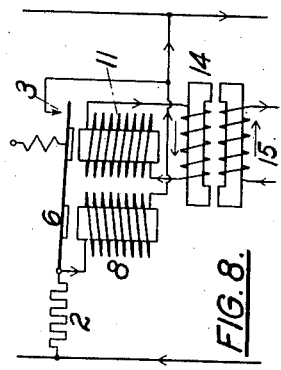
Figure 9:
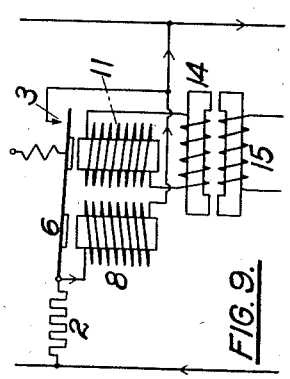

In Figs. 7 to 9 the maintaining coil 8 is shown in the same electrical connection and with the same general shunt arrangement as in Figs. 4 to 6, except that it has a separate core from that of the relay coil 11. The latter, however, is shown supplied from a source independent from that of the maintaining coil, such source being in these figures the secondary winding 14 of a generator, the primary magnet of which is designated by 15. The armature 6 is lengthened out to extend over the cores of both coils.

In Fig. 7 the magnet 15 is shown as dead, with the consequent condition of deënergization of the detector relay, so that the current flows through the shunt to the maintaining coil and the latter is dead.

In Fig. 8 the magnet 15 is illustrated as momentarily energized with a consequent energization by induction of the detector relay. This draws down the armature 6 from the contact 3, and breaks the shunt so that the maintaining coil becomes energized. This in turn acts on the armature 6, and when the detector relay becomes deënergized, as in Fig. 9, prevents the shunt circuit being reëstablished.

Figure 10:
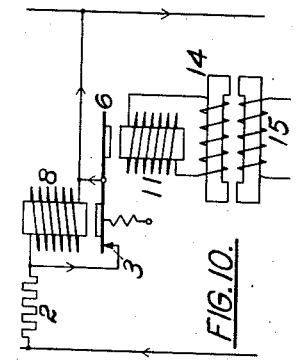
Figure 11:
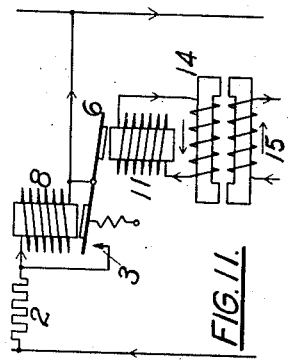
Figure 12:
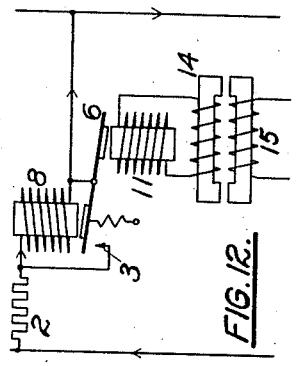

Figs. 10 to 12 show a similar arrangement to that of Figs. 7 to 9, in that the maintaining coil, its connections and its shunts are similar to those of the last named figures, and the detector relay coil is independently energized. The coils, however, instead of being located both on the same side of the armature pivot, are located on opposite sides, and the armature 6 (still acting in double capacity) is pivoted centrally between them.

In Fig. 10 the magnet 15 and the detector relay are both dead, so that the current flows through the shunt to the maintaining coil, and the latter is dead.

In Fig. 11 the magnet 15 and the detector relay are momentarily alive, so that the armature 6 is drawn toward the latter coil and rotated on its pivot, and the shunt to the maintaining coil is broken at the contact 3. The maintaining coil is thus energized, and when the detector relay is dead, as in Fig. 12, the maintaining coil 8 maintains the armature in the same position as in Fig. 11 and continues the break in the shunt circuit.

In Figs. 13 to 15, the circuit of the maintaining coil 8 is the same as in the preceding figures under discussion, but its shunt has two breaks in series, as in Fig. 3, and comprises the armature 6 and contact 3 of the detector relay 11 and its own armature 9 and contact 10. The manner of energizing the detector relay is not shown, but it is understood that it can be energized from any suitable source.

In Fig. 13 the detector relay is shown dead and the current flows through the shunt of the maintaining coil, which coil is dead.

In Fig. 14 the detector relay is momentarily energized, its armature 6 drawn away from the contact 3 and the shunt circuit broken, which immediately results in the energizing of the maintaining coil and a withdrawing of its armature 9 from the contact 10.

In Fig. 15 the detector relay is shown as dead and its armature as once more making contact with the contact 3; but the shunt circuit is maintained open at the contact 10 by the armature of the live maintaining coil still being retracted.

Figs. 16 to 18 illustrate how the maintaining coil can be made use of in connection with a third or operating coil 16. The arrangement of the detector relay and maintaining coils, their circuits and the shunt to the maintaining coil are the same as in Figs. 13 to 15.

The operating coil 16 is connected at one end with one of the battery leads, and connection to the other lead is made whenever the armature 9 of the maintaining coil 8 is drawn up against its back contact 17 with which the operating coil is connected. The operating coil is shown as provided with an armature 18.

Fig. 16 shows the same condition in respect to the detector relay and maintaining coils and their armatures and circuits as Fig. 13, so that the operating coil is dead.

Fig. 17 shows the same condition in respect to the detector relay and maintaining coils and their armatures and circuits as Fig. 14, so that the maintaining coil armature 9 is now drawn against the contact 17, and a circuit is established through the operating coil 16, whose armature is of course drawn upward thereby.

Fig. 18 shows the same condition of the detector relay and maintaining coils, and their armatures and circuits as Fig. 15, but although the detector relay is dead and its armature 16 has reëstablished contact at the contact 3, the third coil is alive and its armature retracted, for the maintaining coil retains its armature against contact 17, and the circuit of the operating coil is still complete.

The operating coil and its armature are serviceable for any purpose to which they are adapted.

In Figs. 19 to 24, I have shown the detector relay and maintaining coils and their circuits in a slightly different arrangement than in the other drawings of this series, commencing with Fig. 4, and may be said to represent a combination of the drawings, Figs. 2 and 3. Commencing with Fig. 4, the maintaining coil is shown as being in series with a non-inductive resistance and as being provided with a very low resistance shunt; but in Figs. 19 to 24 the maintaining coil is connected directly across the battery leads and is normally energized. On the same core with the maintaining coil is mounted differentially an equal and opposing coil 7, the two coils neutralizing their respective effect upon the core when both are energized. The differential coil is also connected across the battery leads, and in series with it are the detector relay coil armature 6, contact 3, contact 10, and maintaining coil armature 9. The manner of energizing the detector relay 11 is not shown, but may be from any source.

In Fig. 19, the detector relay is shown as dead and contact 3 closed; the maintaining coil armature is shown as retracted against the contact 10. Current, therefore, flows through both the maintaining coil and the differential coil as indicated by the arrows, but as the differential and maintaining coils are equal and opposing, their common core is dead and the contact 10 is closed.

In Fig. 20 the detector relay is shown as energized and its armature drawn away from the contact 3. This breaks the circuit of the differential coil, and the core of the maintaining coil now becomes energized and the contact 10 is broken, so that there are two breaks in series in the circuit of the differential coil.

Fig. 21 shows the detector relay deënergized and its armature returned to the contact 3, but the circuit of the differential coil is still broken at the contact 10, and the break maintained by the action of the live maintaining coil.

Figs. 22 to 24 inclusive, illustrate the arrangement of Figs. 19 to 21 inclusive, with a showing of one method of connecting up the operating coil with such an arrangement. In this case the operating coil is connected at one end to one of the battery leads, and at the other end through the back contact 17, when closed, to the other lead. The relative position in respect to the maintaining coil armature 9 is as in Figs. 16 to 18.

Fig. 22 shows the same condition in respect to the detector relay, maintaining and differential coils, and the armatures and circuits, as Fig. 19, so that the core of the operating coil is dead.

Fig. 23 shows the same condition in respect to the detector relay, maintaining and differential coils, and the armatures and circuits, as Fig. 20, so that the contact 17 is closed and a circuit is established through the operating coil. The armature of the operating coil is, as in Fig. 17, drawn up thereby.

Fig. 24 shows the same condition of the detector relay, maintaining and differential coils, and the armatures and circuits as Fig. 21, with a consequent maintaining of the circuit in the operating coil.

Thus the same thing is accomplished with the arrangement of the last six figures as with the arrangement of the other figures of the series. Broadly speaking, the energizing of the detector relay causes a break in a circuit parallel to the maintaining coil, which makes the latter operative, and when so operative it maintains itself operative and is not affected by the deënergizing of the detector relay.

The operating coil or the circuits controlled thereby may have any character or function desired, the resultant action occupying either a short or a long time, and requiring small or large effort, although the initiation through the detector relay may be of the briefest duration and attenuated character, but as stated the specific nature of such character or function forms no part of the invention sought to be protected herein.

It has been before stated that upon the energization of the maintaining coil it remains energized until its circuit is broken. This may be conveniently accomplished by a suitable switch located in its circuit, but in Fig. 25 I have shown means for accomplishing this automatically at the expiration of a desired time interval. In this figure all the elements shown in Figs. 16 to 18 are present, the non-inductive resistance 2 being shown as a lamp, but between the maintaining coil and the non-inductive resistance is included a pair of contacts 19 and 20, which when bridged by a commutator 21, complete the circuit thereof. The commutator is suitably driven by a train 22 and has a definite period of rotation when released, it being normally restrained in position to bridge the contacts by a detent 23 on the armature 18 of the operating magnet 16. When such magnet is energized, as described in connection with Figs. 16 to 18, the detent releases the commutator, which in rotation breaks the circuit of the maintaining magnet, which then releases its armature 9 to complete the shunt around it and break the circuit of the operating magnet. The continued rotation of the commutator before it is brought to rest by the detent again makes the circuit of the maintaining magnet when the above cycle of operations may be repeated. Additional contacts 24, 25 and 26 may be provided to close, in conjunction with the commutator, circuits for effecting desired results.

The foregoing detailed description has been given for clearness of understanding, and no undue limitation should be deduced therefrom, but the appended claims should be construed as broadly as permissible in view of the prior art.

Having thus described my invention, what I claim and desire to secure by Letters Patent is:—

1. The combination with a normally closed circuit containing a source of constant potential and a coil, a normally closed shunt around the coil, and means for opening the shunt and for thereby causing the coil to maintain the shunt open.

2. The combination with a normally closed circuit containing a source of constant potential and a coil and a current limiting resistance, of a normally closed shunt around the coil, and means for momentarily opening the shunt and for thereby causing the coil to open the shunt circuit independent of the subsequent closing of the initially opened contact.

3. The combination with a normally closed circuit containing a source of constant low potential and a coil in series therewith, of a plurality of normally closed contacts in series with each other and in shunt to said coil, and means for opening the shunt at one of said contacts, another of said contacts being opened by the coil to maintain the opening of the shunt independent of the subsequent closing of the initially opened contact.

4. The combination with a normally closed circuit containing a source of constant potential and a relay coil in series therewith, of a plurality of normally closed contacts in series with each other and in shunt to said coil, and means for opening the shunt at one of said contacts, another of said contacts being opened by the relay to maintain the opening of the shunt independent of the subsequent closing of the initially opened contact.

5. The combination with a normally closed circuit containing a source of constant potential and a coil, a normally closed shunt around the coil, means for opening the shunt and for thereby causing the coil to maintain the shunt open, and means for then closing the shunt.

6. The combination with a normally closed circuit containing a source of constant potential and a coil, a normally closed shunt around the coil, means for opening the shunt and for thereby causing the coil to maintain the shunt open, and a timing element controlled by the coil for closing the shunt.

7. The combination with a normally closed circuit containing a source of constant potential and a coil, a normally closed shunt around the coil, means for opening the shunt and for thereby causing the coil to maintain the shunt open, and a timing element controlled by the coil put in motion on the opening of the shunt to close the shunt.

8. The combination with a normally closed circuit containing a source of constant potential and a relay coil in series therewith, of a plurality of normally closed contacts in series with each other and in shunt to said coil, means for opening the shunt at one of said contacts, another of said contacts being opened by the relay to maintain the opening of the shunt independent of the subsequent closing of the initially opened contact, and means for deenergizing the coil.

9. The combination with a normally closed circuit containing a source of constant potential and a relay coil in series therewith, of a plurality of normally closed contacts in series with each other and in shunt to said coil, means for opening the shunt at one of said contacts, another of said contacts being opened by the relay to maintain the opening of the shunt independent of the subsequent closing of the initially opened contact, and a timing controller for automatically deënergizing the coil.

10. The combination with a normally closed circuit containing a source of constant potential and a relay coil in series therewith, of a plurality of normally closed contacts in series with each other and in shunt to said coil, means for opening the shunt at one of said contacts, another of said contacts being opened by the relay to maintain the opening of the shunt independent of the subsequent closing of the initially opened contacts, and a timing controller put in motion by the energization of the relay to deënergize the same.

In testimony whereof I have signed my name.

FRANK J. SPRAGUE.